United States Patent
Subramanian et al.

(10) Patent No.: US 9,323,634 B2
(45) Date of Patent: Apr. 26, 2016

(54) GENERATING A CONFIGURATION FILE BASED UPON AN APPLICATION REGISTRY

(75) Inventors: Bala Subramanian, Sunnyvale, CA (US); Susan Shanabrook, Safety Harbor, FL (US); Richard Stevens, Odessa, FL (US); Denise Glaser, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 419 days.

(21) Appl. No.: 13/431,883

(22) Filed: Mar. 27, 2012

(65) Prior Publication Data

US 2013/0031245 A1   Jan. 31, 2013

Related U.S. Application Data

(60) Provisional application No. 61/511,760, filed on Jul. 26, 2011.

(51) Int. Cl.
| | |
|---|---|
| *G06F 15/173* | (2006.01) |
| *G06F 11/30* | (2006.01) |
| *H04L 29/06* | (2006.01) |
| *H04L 29/08* | (2006.01) |
| *G06F 11/34* | (2006.01) |

(52) U.S. Cl.
CPC .......... *G06F 11/3006* (2013.01); *G06F 11/3051* (2013.01); *H04L 29/06* (2013.01); *H04L 29/08072* (2013.01); *G06F 11/3466* (2013.01); *G06F 2201/865* (2013.01)

(58) Field of Classification Search
CPC ........................... H04L 29/08072; H04L 29/06
USPC .................................................. 709/224–226
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |

(Continued)

OTHER PUBLICATIONS

Lewis, "Understanding the Registry", May 1999.*

*Primary Examiner* — Chris Parry
*Assistant Examiner* — Weiwei Stiltner
(74) *Attorney, Agent, or Firm* — Ingrassia Fisher & Lorenz, P.C.

(57) ABSTRACT

A system and method are provided for generating a configuration file based upon an application registry. The method, for example, includes, but is not limited to, determining, by a processor, which users are logged into the server that are associated with a predetermined group, determining, by the processor, for each user logged into the server associated with the predetermined group, which applications each user is running, and generating, by the processor, the configuration file based upon which applications each user is running and storing the registry file in a memory.

16 Claims, 3 Drawing Sheets

(56) References Cited

U.S. PATENT DOCUMENTS

Figure 1:
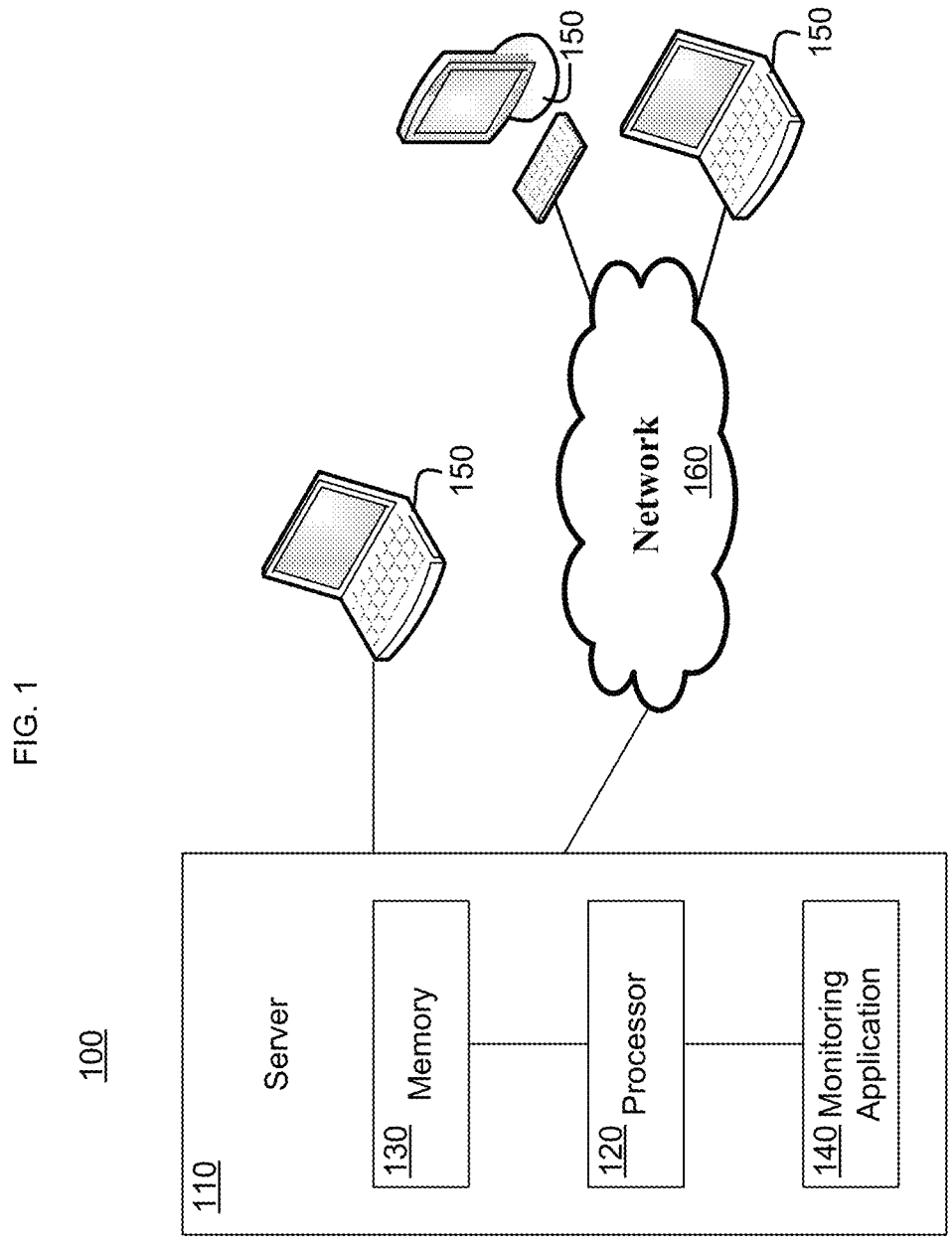

| | | | |
|---|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0084018 A1* | 5/2003 | Chintalapati et al. ............. 707/1 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0086336 A1* | 4/2007 | Richards et al. .............. 370/229 |
| 2009/0204699 A1* | 8/2009 | Kortright ...................... 709/223 |
| 2010/0057520 A1* | 3/2010 | Rejai ................................. 705/9 |
| 2010/0162273 A1* | 6/2010 | Shoji et al. ..................... 719/323 |
| 2011/0004682 A1* | 1/2011 | Honnold et al. ............. 709/224 |
| 2011/0041009 A1* | 2/2011 | Hom et al. ........................ 714/23 |
| 2011/0225649 A1* | 9/2011 | Bhogal et al. .................... 726/22 |
| 2011/0295727 A1* | 12/2011 | Ferris et al. ...................... 705/34 |
| 2012/0005334 A1* | 1/2012 | Raja et al. ...................... 709/224 |
| 2012/0084413 A1* | 4/2012 | Pasternak ...................... 709/221 |
| 2012/0218917 A1* | 8/2012 | Komarevtsen ............... 370/254 |
| 2012/0259960 A1* | 10/2012 | Sharma et al. ................ 709/221 |

* cited by examiner

GENERATING A CONFIGURATION FILE BASED UPON AN APPLICATION REGISTRY

CROSS-REFERENCE TO RELATED APPLICATION(S)

This application claims the benefit of U.S. provisional patent application Ser. No. 61/511,760, filed Jul. 26, 2011, the entire content of which is incorporated by reference herein.

TECHNICAL FIELD

The following relates to data processing systems and processes, and more particularly relates to systems and processes for generating a configuration file based upon an application registry.

BACKGROUND

Monitoring applications are useful tools for monitoring data in servers and other distributed computing systems. Monitoring applications can monitor, report and analyze the data produced by the applications running on the server. Typically the monitoring applications have to be manually configured so that the monitoring application knows what monitoring targets to monitor. Further, if the desired monitoring targets change, the monitoring application has to be manually reconfigured.

DESCRIPTION OF THE DRAWING FIGURES

Figure 2:
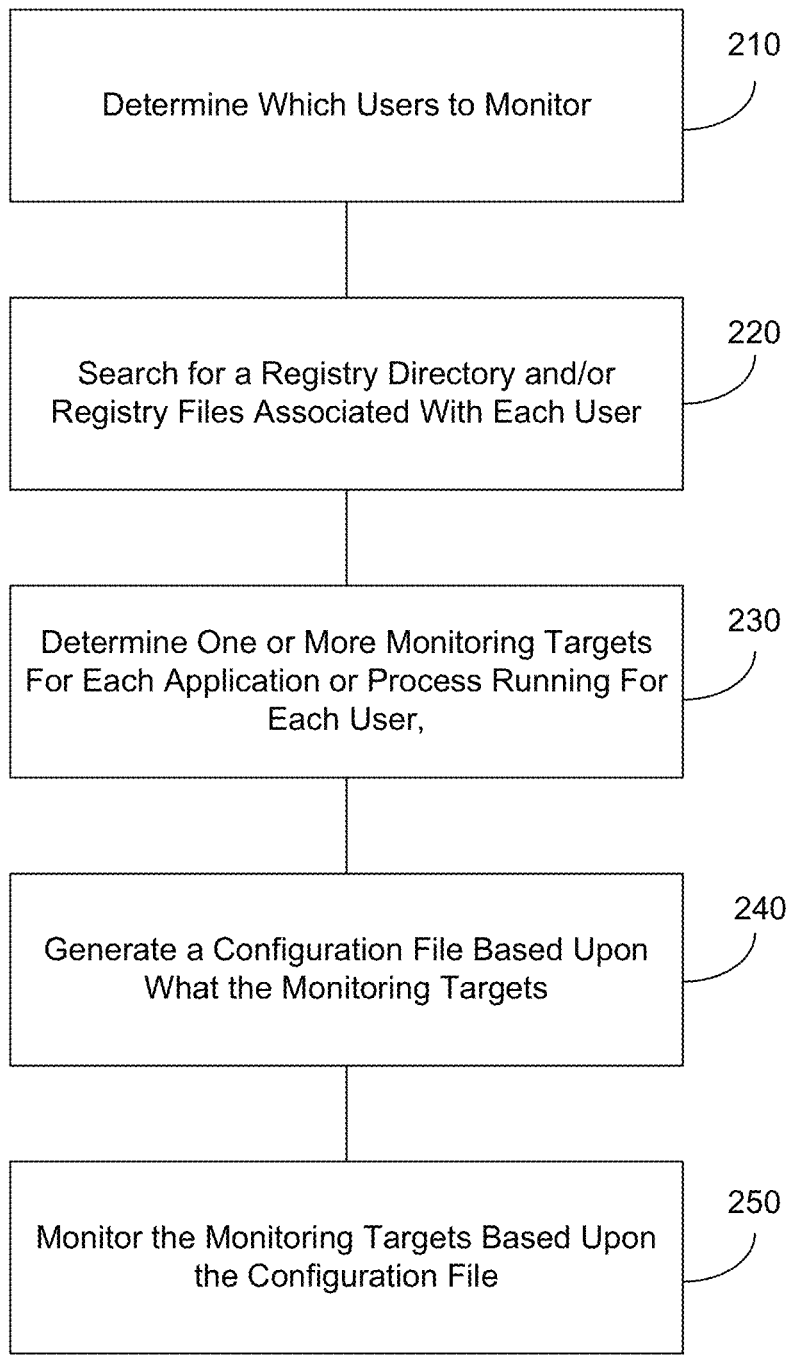
Figure 3:
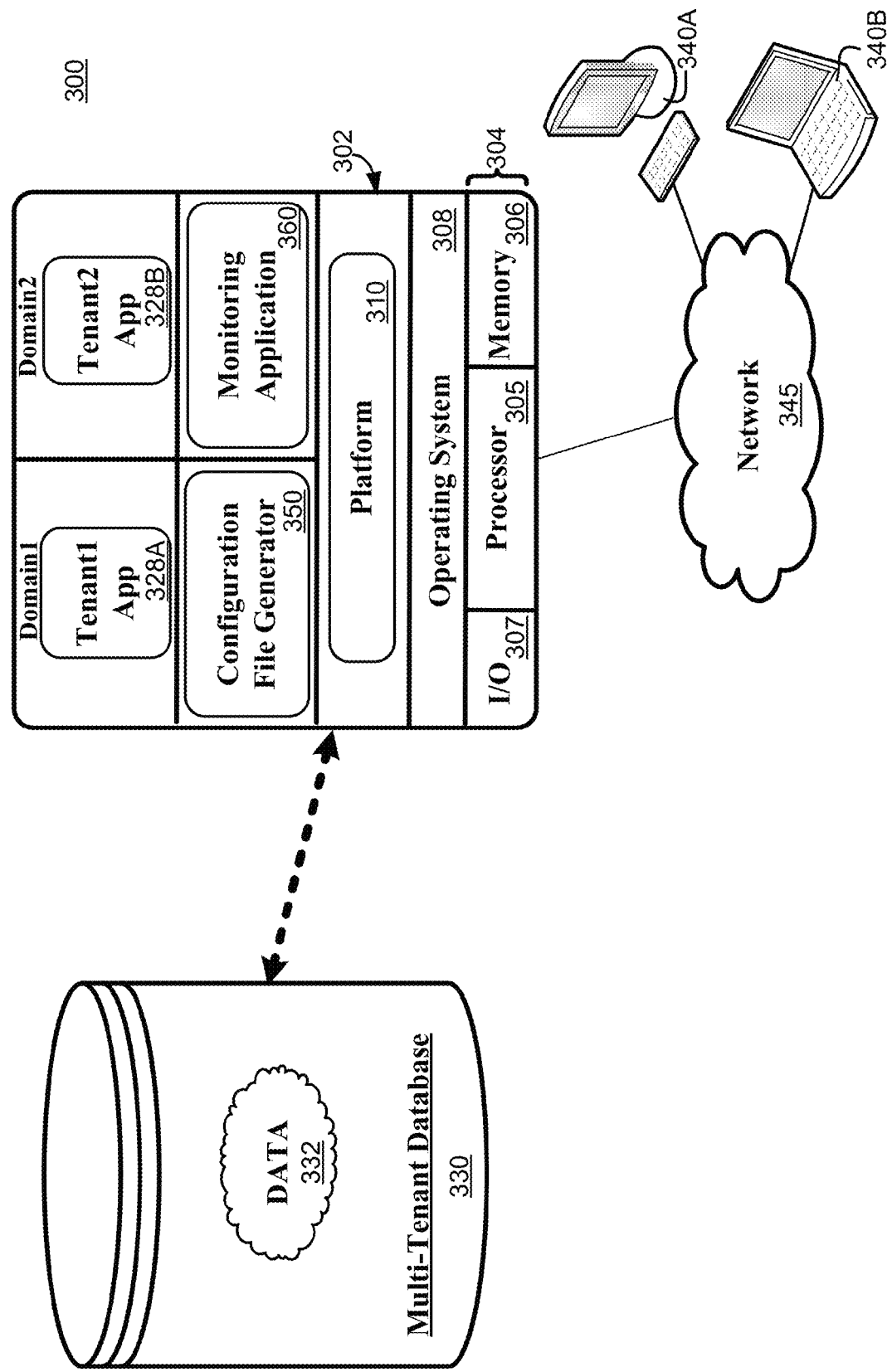

Exemplary embodiments will hereinafter be described in conjunction with the following drawing figures, wherein like numerals denote like elements, and FIG. 1 is a block diagram of an exemplary system for generating a configuration file, in accordance with an embodiment;

FIG. 2 is a flow chart illustrating a method for generating a configuration file, in accordance with an embodiment; and FIG. 3 is a block diagram of another exemplary system for generating a configuration file, in accordance with an embodiment.

DETAILED DESCRIPTION

According to various exemplary embodiments, systems and methods are provided for generating a configuration file based upon an application registry directory. The application registry directory includes an indication of each application or process running for each user on the server. Each application can be associated with a monitoring target. Accordingly, by leveraging the registry directory to create a configuration file, a monitoring application can automatically be configured to monitor desired monitoring targets without any user direction.

FIG. 1 illustrates a system 100 for generating a configuration file, in accordance with an embodiment. The system 100 includes at least one server 110. The server 110 may be implemented using any type of computing platform, hardware, technology, etc. For example, the server 100 may be a multi-tenant database server, a data center, a distributed computing system, or any other type of server.

The server 110 includes a processor 120 coupled to a memory 130. The processor 120 may be realized using any type of processor hardware, platform, or technology. For example, the processor 120 could be a central processing unit (CPU), graphical processing unit (GPU), a physics processing unit (PPU), a microcontroller, an application specific integrated circuit (ASIC), a field-programmable gate array (FPGA) or any other type of logic device, or combination thereof. The memory 130 may be one or more non-volatile memories, one or more volatile memories or any combination thereof.

One or more users may be logged into the server 110 from a computer 150. A user may be logged into the server if the user's computer 150 is connected to the server via a network 160 or communicatively connected to the server 110 in any other manner. Each user may be running one or more applications or other processes on the server 110. Furthermore, applications may be running on the server 110 and may have a uniquely defined user associated with them, however, the uniquely defined user may not be an actual person. In other words, the users logged into the server may be actual users, virtual users, or a combination thereof. The server 110 may store the identification of each process or application a user is running in an application registry directory or an application registry file associated with the user stored in the memory 130. The server 110 may update the registry file or directory dynamically based upon the applications and/or processes each user is running In one embodiment, for example, the server 110 may be a Linux server. In this embodiment, for example, the server 110 may attempt to locate a "/home/<user>/registry" directory for each user. The "/home/<user>/registry" directory would include a registry file for each application the user is running on the server 110. Furthermore, the server 110 may only search for the registry directory for user's in a predetermined group such that only the applications of the user's in the predetermined group are monitored, as discussed in further detail below.

In one embodiment, for example, the server 110 includes a monitoring application 140, as illustrated in FIG. 1. In another embodiment, for example, the monitoring application can be run from another computer in communication with the server 110. The monitoring application 140 can monitor, report and analyze the data produced by the applications running on the server 110. In one embodiment, for example, the monitoring application 140 lets users search, monitor and analyze machine-generated data via web-style interface. The monitoring application may capture indexes and correlate real-time data in a searchable repository from which it can generate graphs, reports, alerts and dashboards.

The monitoring application 140 can be configured at run time to determine what monitoring targets the monitoring application 140 needs to monitor based upon a configuration file. Each application run by a user on the server could correspond to a monitoring target in the system 100 that the monitoring application should monitor. The monitoring targets may include, but are not limited to, data being generated by the applications, network infrastructure, network security, or any other desirable trackable data. The configuration file used to configure the monitoring application 140 may be created by the server 110 based upon the applications being run by users logged into the server, as discussed in further detail below.

FIG. 2 is a flow chart illustrating an exemplary method 200 for generating a configuration file suitable for configuring a monitoring application, such as the monitoring application 140 illustrated in FIG. 1. The method begins by determining which users to monitor. (Step 210). In one embodiment, for example, a processor, such as processor 120, may determine which users to monitor based upon a group or other attribute associated with each user. The server 110, for example, may generate a session list which lists each of the users logged into the server and which group the user is associated with. As discussed above, the server 110 could be a Linux server. Linux servers typically organize users by groups. Accordingly, in one embodiment, for example, the users in one or more predetermined groups could be selected to monitor. The monitoring application 140 could also be associated with a group. Accordingly, in one embodiment, for example, the users in the same group as the monitoring application 140 may be chosen to be monitored. In other embodiments, for example, users may be associated by permission or security levels, accounts, businesses, domains, or with any other attribute or combination thereof.

After the users to be monitored are identified, a search is performed for a registry directory and/or registry files associated with each user. (Step 220). In one embodiment, for example, the processor 120 or another suitable processor could perform the search. As discussed above, the server 110 could be a Linux server. Accordingly, in one embodiment, a search could be performed for a "/home/<user>/registry" directory for each user. The "/home/<user>/registry" directory in a Linux environment should include a registry file for each application or process the user is running on the server. The location of the registry directory and/or registry files in other environments may vary depending upon the environment.

Once the registry directory and/or registry files that each user is running are identified, one or more monitoring target for each application included in the registry directory and/or registry files is determined. (Step 230). Each application or process being run by a user may correspond to a monitoring target in a system, such as the system 100 illustrated in FIG. 1, to be monitored. For example, a first application being run by a user may indicate that the monitoring application should monitor network activity and a second application run by a user may indicate that the monitoring application should monitor certain entries in a database. In one embodiment, for example, a lookup table may be stored in memory. The lookup table may associate an application or process capable of being run by a user with one or more monitoring targets. In another embodiment, for example, the server 110 may use internal coding logic to determine what aspects of the system 100 to monitor. As discussed above, a monitoring application may monitor any data associated with the system, including, but not limited to, data being generated by the applications, log directories, network infrastructure, and network security. In one embodiment, for example, the monitoring application may determine if some component is running when the component shouldn't be running, or not running of the component should be running, and issues alerts based thereon.

In one embodiment, for example, a processor, such as the processor 120 illustrated in FIG. 1, may generate a list of monitoring targets based upon the identified registry directory and registry files. In some instances multiple users may be running the same application or multiple applications could have overlapping monitoring targets. Accordingly, in one embodiment, for example, the processor may eliminate duplicated applications, processes and monitoring targets from the list prior to generating the configuration file.

After the monitoring targets are identified, a configuration file is generated for the monitoring application. (Step 240). The configuration file includes an indication of each of the monitoring targets to be monitored by a monitoring application. The configuration file may be generated to have a format having predetermined characteristics such that a monitoring application can easily be configured by reading the configuration file. In one embodiment, for example, a processor, such as processor 120 illustrated in FIG. 1, will locate a template associated with each monitoring target and use the template(s) to generate the appropriate data for the configuration file. In one embodiment, for example, the configuration file may be dynamically updated each time a process or application is started or ceased by a user. In another embodiment, for example, the configuration file may be updated periodically at set intervals. The processor may also be configured to update the configuration file upon request. In one embodiment, for example, a user may request a refresh of the monitoring application.

The configuration file may be saved at a predetermined location (e.g., a predetermined directory) and with a predetermined name. Accordingly, the monitoring application, upon being initiated, can easily locate the configuration file and determine which monitoring targets to monitor based upon the configuration file. (Step 250). As discussed above, the monitoring application may be configured to monitor different monitoring targets based upon a configuration file each time the monitoring application is initiated. The monitoring application may also dynamically update the monitoring targets to be monitored if the configuration file is updated.

FIG. 3 illustrates an exemplary multi-tenant application system 300 which may also be configured to generate a configuration file, as discussed above. The multi-tenant application system 300 suitably includes a server 302 that dynamically creates virtual applications 328A-B based upon data 332 from a common database 330 that is shared between multiple tenants. Data and services generated by the virtual applications 328A-B are provided via network 345 to any number of client devices 340A-B, as desired. Each virtual application 328A-B is suitably generated at run-time using a common platform 310 that securely provides access to data 332 in database 330 for each of the various tenants subscribing to system 300. Each virtual application 328A-B may be accessible via a unique domain. For example, the virtual application 328A may be accessible on a first domain (e.g., http://www.companyname1.salesforce.com) and the application 328B may be accessible on a second domain (e.g., http://www.companyname2.com). The virtual applications 328A-B may be used, for example, by the various tenants to create and manage data or reports based upon data 332 in the common database 330. The server 302 also includes a configuration file generator 350 for generating a configuration file and a monitoring application 360 for monitoring the multi-tenant application system 300, as discussed above. While in the embodiment illustrated in FIG. 3 illustrates a single server 302, the functionality of the server 302 need not be found in a single piece of hardware as shown, but could be distributed among a plurality of server machines.

A "tenant" generally refers to a group of users that shares access to common data within database 330. Tenants may represent customers, customer departments, business or legal organizations, and/or any other entities that maintain data for particular sets of users within system 300. Although multiple tenants may share access to a common server 302 and database 330, the particular data and services provided from server 302 to each tenant can be securely isolated from those provided to other tenants. The multi-tenant architecture allows different sets of users to share functionality without necessarily sharing each other's data 332.

Database 330 is any sort of repository or other data storage system capable of storing and managing data 332 associated with any number of tenants. Database 330 may be implemented using any type of conventional database server hardware. In various embodiments, database 330 shares processing hardware 304 with server 302. In other embodiments, database 330 is implemented using separate physical and/or virtual database server hardware that communicates with server 302 to perform the various functions described herein.

Server 302 is implemented using one or more actual and/or virtual computing systems that collectively provide a dynamic application platform 310 for generating virtual applications 328A-B. Server 302 operates with any sort of conventional computing hardware 304, such as any processor 305, memory 306, input/output features 307 and the like. Processor 305 may be implemented using one or more of microprocessors, microcontrollers, processing cores and/or other computing resources spread across any number of distributed or integrated systems, including any number of "cloud-based" or other virtual systems. Memory 306 represents any non-transitory short or long term storage capable of storing programming instructions for execution on processor 305, including any sort of random access memory (RAM), read only memory (ROM), flash memory, magnetic or optical mass storage, and/or the like. Input/output features 307 represent conventional interfaces to networks (e.g., to network 345, or any other local area, wide area or other network), mass storage, display devices, data entry devices and/or the like. In a typical embodiment, application platform 310 gains access to processing resources, communications interfaces and other features of hardware 304 using any sort of conventional or proprietary operating system 308. As noted above, server 302 may be implemented using a cluster of actual and/or virtual servers operating in conjunction with each other, typically in association with conventional network communications, cluster management, load balancing and other features as appropriate.

Generally speaking, the various functions and features of method 200 may be carried out with any sort of hardware, software and/or firmware logic that is stored and/or executed on any platform. Some or all of method 200 may be carried out, for example, by logic executing within system 100 in FIG. 1 or the system 300 in FIG. 3. For example, various functions shown in FIG. 2 may be implemented using software or firmware logic that is stored in memory 306 and executed by processor 305 as part of application platform 310. The particular hardware, software and/or firmware logic that implements any of the various functions shown in FIG. 2, however, may vary from context to context, implementation to implementation, and embodiment to embodiment in accordance with the various features, structures and environments set forth herein. The particular means used to implement each of the various functions shown in FIG. 2, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A computer executed method for generating a configuration file on a server, comprising:
   determining, by a processor, which users associated with a predetermined group are logged into the server;
   determining, by the processor, for each user logged into the server associated with the predetermined group, which applications each user is running by:
      searching, by the processor, for a registry directory associated with each user, and
      determining, by the processor, which applications each user is running based upon registry files associated with the registry directory,
   generating, by the processor, the configuration file based upon which applications each user is running, the configuration file indicating at least one monitoring target selected from at least one of a data entry in a database system, a network infrastructure element and a network security process according to a lookup table associating the applications each user is running with one of the monitoring targets;
   storing the configuration file at a predefined location in a memory; and
   configuring a monitoring application to monitor one or more monitoring targets based upon which applications each user is running by accessing the configuration file at the predefined location in the memory upon initiating the monitoring application.

2. The method of claim 1, wherein determining which applications each user is running further comprises:
   generating a list of monitoring targets based upon the applications each user is running; and
   eliminating any duplicate monitoring targets listed in the generated list.

3. The method of claim 2, wherein the configuration file is generated based upon the list of monitoring targets.

4. The method of claim 3, wherein the generating, by the processor, the configuration file further comprises:
   locating, by the processor, a template for each monitoring target in the list; and
   generating, by the processor, the configuration file based upon the located templates.

5. The method of claim 1, wherein the predetermined group is based upon a group associated with a monitoring application.

6. A system for generating a configuration file, comprising:
   a server, comprising:
      a memory; and
      a processor communicatively coupled to the memory, the processor configured to:
         determine which of one or more users logged into the system to monitor;
         determine which applications the determined one or more users are running by:
            locating a registry directory associated with each of the determined one or more users; and
            determining which applications the determined one or more users are running based upon registry files located in the registry directory;
         generate the configuration file based upon the determined applications, the configuration file indicating at least one monitoring target selected from at least one of a data entry in a database system, a network infrastructure element and a network security process according to a lookup table associating the applications each user is running with one of the monitoring targets;

store the configuration file at a predefined location in the memory; and initiate a monitoring application to monitor the applications the determined one or more users are running by accessing the configuration file at the predefined location in the memory upon initiating the monitoring application.

7. The system of claim 6, wherein the processor when determining which of one or more users logged into the system to monitor, is further configured to:

determine a group associated with each user logged into the server; and determine which of one or more users logged into the system to monitor based upon the group associated with each user logged into the server.

8. The system of claim 6, wherein the processor is further configured to determine one or more monitoring targets for each determined application.

9. The system of claim 8, wherein when the processor is determining the one or more monitoring targets for each determined application, the processor is further configured to:

generate a list of monitoring based upon the determined applications; and eliminate duplicate monitoring targets from the list.

10. The system of claim 9, wherein the processor when generating the configuration file based upon the determined applications, is further configured to:

locate a template for each of the one or more monitoring targets; and generate the configuration file based upon the located templates.

11. A server comprising a processor and a memory, the processor configured to execute a monitoring application, the processor further configured to:

determine a group of users logged into the server;

locate a registry directory for each user in the group;

determine one or more processes each user in the group is running on the server based upon registry files located in the respective registry directories;

determine one or more monitoring targets based upon the one or more processes each user in the group is running;

generate a configuration file based upon the one or more monitoring targets, the configuration file indicating at least one monitoring target selected from at least one of a data entry in a database system, a network infrastructure element and a network security process according to a lookup table associating the applications each user is running with one of the monitoring targets;

storing the configuration file at a predefined location in the memory; and initiate the monitoring application by accessing the configuration file at the predefined location in the memory upon initiating the monitoring application.

12. The server of claim 11, wherein the server is a Linux server and the monitoring application is associated with the group.

13. The server of claim 11, wherein at least one of the monitoring targets is a log stored in the memory.

14. The server of claim 11, wherein the processor, when generating the configuration file based upon the one or more monitoring targets, is further configured to:

locate one or more templates associated with the one or more monitoring targets; and generate the configuration file based upon the one or more templates.

15. The server of claim 11, wherein the processor is further configured to dynamically update the configuration file when a new process is started by any user in the group and when a old processes is ended by any user in the group.

16. The server of claim 15, wherein the processor is further configured to dynamically configure the monitoring application based upon the configuration file.

* * * * *